United States Patent [19]
Crowley et al.

[11] Patent Number: 5,493,702
[45] Date of Patent: Feb. 20, 1996

[54] ANTENNA TRANSMISSION COUPLING ARRANGEMENT

[76] Inventors: Robert J. Crowley, 37 Castle Gate Rd., Wayland, Mass. 01778; Donald N. Halgren, 35 Central St., Manchester, Mass. 01944

[21] Appl. No.: 42,879

[22] Filed: Apr. 5, 1993

[51] Int. Cl.$^6$ ................................................ H01Q 1/24
[52] U.S. Cl. .......................... 455/89; 455/90; 343/702
[58] Field of Search .................................. 379/437, 451, 379/426, 446, 455, 58, 59; 455/89, 90, 300; 343/702, 841; 361/814

[56] References Cited

U.S. PATENT DOCUMENTS

| | | | |
|---|---|---|---|
| 4,740,794 | 4/1988 | Phillips et al. | 455/90 |
| 4,850,006 | 6/1989 | Sasaki et al. | 379/451 |
| 5,335,366 | 8/1994 | Daniels | 455/89 |

*Primary Examiner*—Reinhard J. Eisenzopf
*Assistant Examiner*—Thanh Le
*Attorney, Agent, or Firm*—Don Halgren

[57] ABSTRACT

An arrangement for permitting the safe, shielded use of a hand held cellular telephone in a structure such as a building or a vehicle or airplane through the use of a dock which receives the cellular telephone and its short external antenna. The dock includes a housing which encloses the antenna and couples it to a more distant antenna external to the structure through a sheilded transmission cable, where the RF signals may be sent and received without harm to the person using the cellular telephone.

16 Claims, 2 Drawing Sheets

5,493,702

ANTENNA TRANSMISSION COUPLING ARRANGEMENT

BACKGROUND OF THE INVENTION (1) This invention relates to a docking system for hand-held cellular telephones, for structures or vehicles.

(2) Prior Art

Extraneous radio frequency emmission has become a serious concern of hand-held cellular telephone manufacturers and users alike. RF radiation has been considered a potential carcinogen.

The proliferation of these hand-held devices is evident everywhere. Hand held devices however, should be usable in automobiles, planes, cabs or buildings without causing concern of the radiation therefrom. The hand-held devices should be portable for a user to carry in his pocket, yet be able to use that same cellular unit in such vehicle or building while minimizing such radiational effect therein.

It is an object of the present invention to permit a user of a hand-held cellular to conveniently use that same hand-held cellular phone in an automobile, plane or building.

It is a further object of the present invention to minimize any radiation from such a hand-held cellular telephone, while such use occurs in an automobile, a building or an elevator, an airplane, a cab, or other public facility in which the user wishes to minimize his exposure to stray radiation; to avoid the necessity of connecting and deconnecting cables and to permit a wide variety of cellular telephones such as would be utilized in a rental car where various manufactures' phones would be used; and to avoid repeated reuse of coaxial connections that would otherwise be subject to wear, dirt and poor connections so as to be the source of undesired RF leakage.

BRIEF SUMMARY OF THE INVENTION

The present invention comprises a docking system adaptable to an automobile, plane or building for receipt of and cradling of a hand-held cellular telephone, to permit a mating of the antenna of the cellular telephone, with an emmissive free receiver, to direct the signal through a coax cable and an outside antenna.

The docking system includes a housing which also captures the hand-held cellular telephone. The housing may include a contact arrangement to charge the hand-held cellular telephone batteries during its cradling within the vehicle or building.

The housing comprises a metal case, such as aluminum or a conductive plastic which matively receives the antenna and the telephone unit itself. The housing comprises a separate compartment for the antenna and for the telephone. The antenna compartment may be brass lined on its inner surface with a silver plating thereon. A broadband coupling probe is arranged adjacent the antenna within the antenna compartment. A ferrite attenuator may be arranged between the antenna compartment and telephone compartment of the housing. A metallic backplate may arranged to capacitively couple the telephone chassis to an RF ground.

A coupling probe may be attached, through a proper coaxial cable, to an external antenna, in the vehicle or building, as the case may be.

It is an object of the present invention to provide a shielded antenna docking arrangement for using a portable hand held telephone in an vehicle such as a plane, an automobile or a cab or in a public or private building or elevator.

It is a further object of the present invention to provide an efficient low cost quick coupling of a hand held portable telephone to use in an automobile, building or plane while providing an improved range for use of that telephone.

It is yet a further object of the present invention to provide a system which permits the shielded use of a hand held (cellular) telephone, while also providing a recharging of the batteries of that hand held telephone.

The invention thus includes an arrangement for permitting the safe, shielded use of a hand-held cellular telephone in a structure comprising: a conductive housing having an antenna compartment; a partition separating the antenna compartment from the telephone; an antenna adapter arranged to transfer signals with respect to an antenna of the cellular telephone and an external antenna therewith.

The invention also includes the antenna compartment with an RF lining shield arranged therein. The RF lining may comprise a silver-plated brass shield. The separator partition may comprise a ferrite attenuator. The invention may include a means for charging the cellular telephone while it is disposed within the housing. The housing may be connected to a remote loudspeaker and microphone, to permit a cellular hand-held telephone to be operated "hands-free" therewith. The structure may be an automobile, a building, an airplane, or an elevator. The invention includes a method for permitting the safe, shielded use of a hand-held cellular telephone in a structure, comprising the steps of: providing a conductive housing for enclosure of an antenna and a cellular telephone therewith; empowering the housing with a support circuit to permit use of such a cellular telephone therewith; shielding the antenna within the conductive housing so as to contain RF signals therewithin; transmitting signals between an external antenna and an antenna enclosed within the conductive housing; resonating said conductive housing near the operating frequency of the telephone; coupling transmitted and recieved RF energy through the antenna to an external transmission line and antenna external of the structure.

The invention includes a method for permitting the safe, shielded use of a hand held cellular telephone having a short antenna thereon, in a structure, comprising the steps of: providing a conductive housing arranged to radiationally enclose the short external antenna of a hand held cellular telephone; connecting the conductive housing through an RF transmission line and connector, to an antenna external of the structure; resonating the conductive housing near the operating frequency of the hand held cellular telephone; coupling transmitted and received RF energy from the short antenna through the antenna external of the structure.

BRIEF DESCRIPTION OF THE DRAWINGS

The objects and advantages of the present invention will become more apparent when viewed in conjunction with the following drawings in which.

DESCRIPTION OF THE PREFERRED EMBODIMENTS

Figure 1:
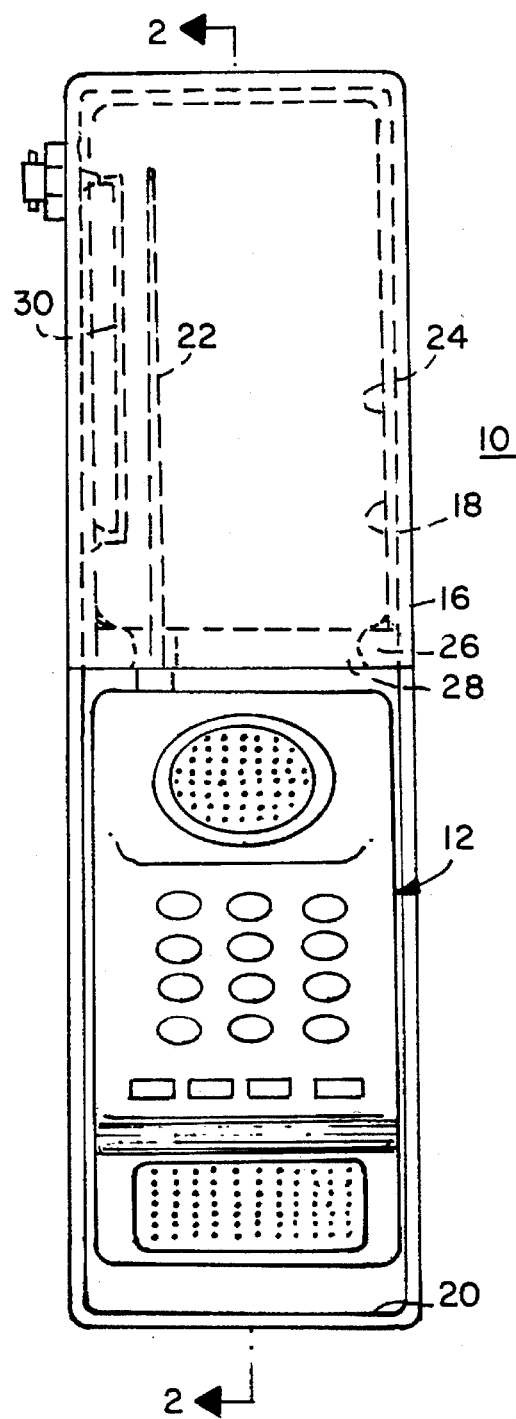
FIG. 1 is a plan view of a telephone docking housing arrangement, with portions omitted for clarity.

Referring now to the drawings in detail, and particularly to FIG. 1, there is shown a hand-held cellular or portable telephone docking arrangement 10, to permit a hand-held cellular or portable telephone 12 to be utilized within a vehicle or structure and as a personal telephone carried on an individual.

The docking arrangement 10 comprises a housing 16, fabricated typically from a metal, such as aluminum, or from a conductively coated plastic, such as a polycarbonate. The docking arrangement includes the housing 16 which is divided into an antenna receiving compartment 18, and a cellular telephone receiving compartment 20. The antenna receiving compartment 18, is more fully resonant at the frequency range of about 860 MHz, and fully encloses an antenna 22 received therein, to provide RF shielding therefrom. The antenna compartment 18 may have silver plated brass 24 lining the inner walls thereof, as shown in FIG. 1. The antenna compartment 18, preferably has interior dimensions of about 4.5 cm by about 1.9 cm by about 12.38 cm, or other dimensions which provides a rough equivalent volume in the antenna compartment 18, as the aforementioned dimensions. This produces a fundamental resonant frequency of about 286 MHz and will operate efficiently at about 860 MHz which is the third harmonic frequency and provides a cavity large enough to accommodate most cellular telephone antennas. It is adaptable to other frequencies that 860 MHz, from the VHF region to the microwave region through dimensional changes in the antenna compartment 18. An antenna piercable wall structure for segregating the antenna compartment 18 from the user, may preferably be comprised of a ferrite attenuator 26, or partition, which acts as a choke between the antenna compartment 18 and the user and telephone compartment 20, to prevent the emmission from the antenna compartment 18, of stray RF energy, or at least lower it to an acceptable level. An opening 28 is disposed within the ferrite attenuator 26, to permit an antenna 22 to be disposed within the compartment 18.

Figure 3:
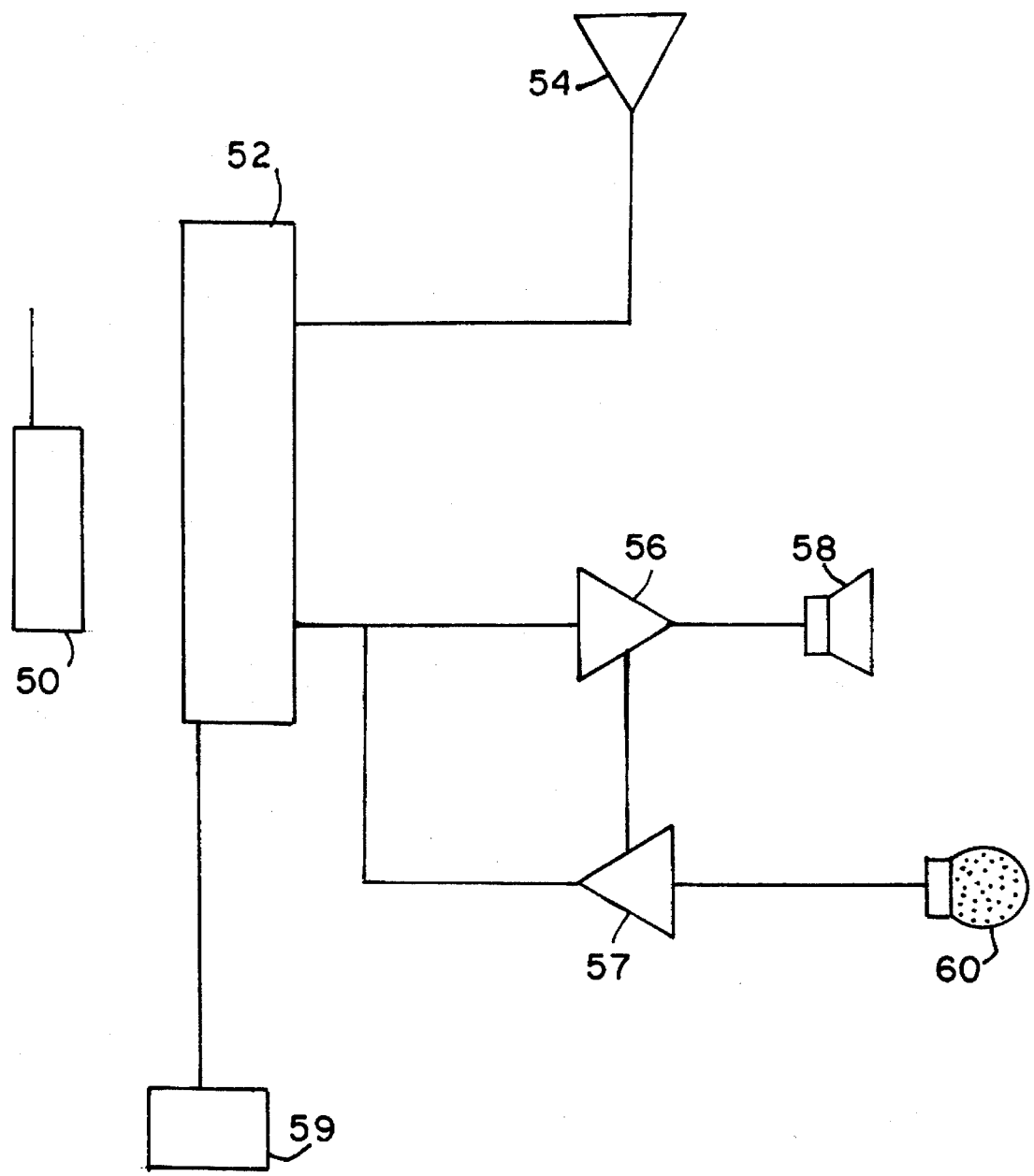
FIG. 3 is a block diagram of a docking system for a hand-held cellular telephone.

A broadband coupling probe 30 is arranged within the antenna compartment 18, and is connected, through appropriate coax cable to an external antenna (vehicle structure) as shown in FIG. 3, in block diagram form. The coupling probe is tuned to a central resonent frequency of about 860 MHz, with a nominal 50 ohm load at the terminal. The probe 30 may also be comprised of an ungrounded capacitive coupling probe or plate, which serves the same function as the inductive probe. Other couplings 30 may include radiation couplings and galvanic couplings which are arrangeable in close proximity to the antenna 22, for transmission to and from the external antenna.

Figure 2:
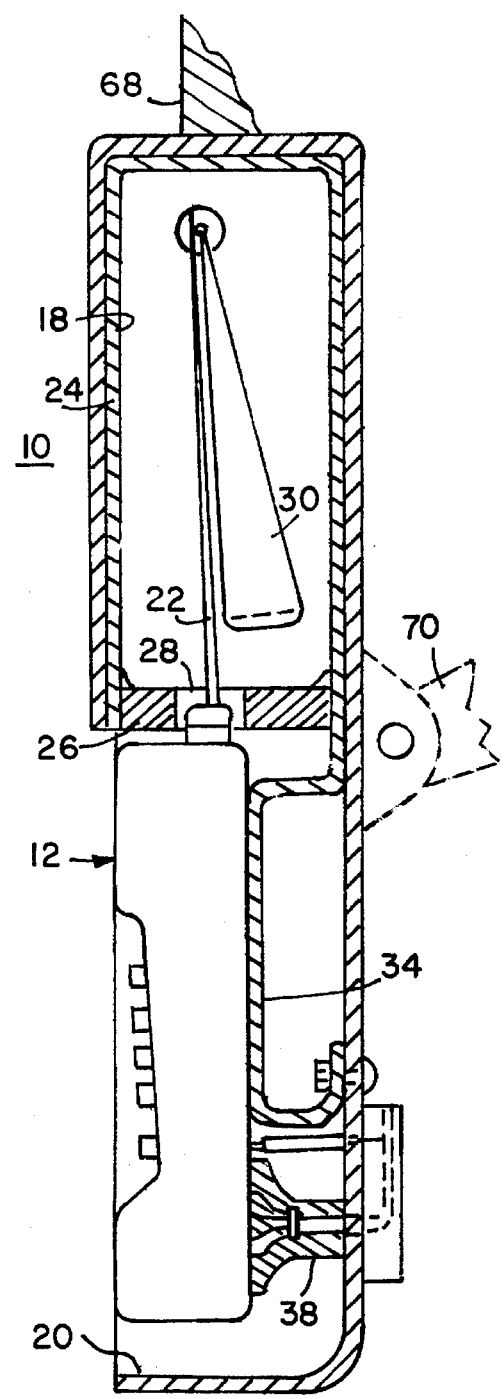
FIG. 2 is a view taken along the lines A—A of Figure 1.

The telephone 12 is arranged to be snugly received within the telephone compartment 20, as shown in FIGS. 1 and 2. The compartment 20, may have a capacitive ground backing plate 34, made of aluminum, in conductive communication with the housing 16. The housing 16, is of course attached to an RF ground connector 36, such RF ground being carried to the ground side of the connector.

The telephone compartment 20 may have a biased charger pin arrangement 38, which is in connective communication with the electrical system of the structure (vehicle, building or airplane), to permit the hand-held cellular telephone 12 to be charged while it is emplaced within the docking arrangement 10.

The block diagram of the docking arrangement 10, is shown in FIG. 3, wherein a hand held cellular telephone unit 50 is placed in antenna mating relationship with a coupling probe of a cellular phone dock 52. The dock 52 is attached for example, to an external (automobile) antenna 54. It is to be noted that the dock 52 could be disposed in the wall of a building, or in an elevator, an airplane, or just about anywhere an external antenna may be arranged to pickup RF signals and keep them from close proximity to a person who is using the hand held cellular unit. The dock may be actually built into a wall 68 of the entity using the dock 52, or it may be on an articulable arm 70, so as to bring the dock 52 within adjustable reach of people. The dock 52, in any case, may be attached to an audio output amplifier 56 which feeds a signal to a loudspeaker 58, when it is set up in a vehicle. A remote mounted microphone 60 is connected to a microphone null amplifier 57 and the output amplifier 56, to permit hands-free operation of a telephone 50 while using this docking arrangement 10 in an automobile (or other aforementioned facility) without acoustic feedback.

The telephone unit 50 is charged through a 12.8 volt regulator 59, which picks up power through the electrical system of the structure (automobile, building or airplane), to which the docking arrangement 10 is attached. The unit permits efficient, inexpensive and convenient means for holding and operating a handheld cellular telephone within a vehicle, airplane or building, while effectively shielding the occupants from potentially harmful RF energy.

We claim:

1. A docking system for connecting a portable communication device to a further signal transmission line, said portable communication device having an external radiative antenna, said system comprising:

a shielded housing for receivably enclosing at least a portion of said external radiative antenna of said portable communication device; and a coupling probe mounted within said shielded housing for radiatively coupling between said external antenna of said portable communication device and said further signal transmission line via radio frequency energy therebetween.

2. The docking system as recited in claim 1, wherein said shielded housing is comprised of an electrically conductive material.

3. The docking system as recited in claim 1, wherein a radio frequency absorbent material is arranged within said shielded housing.

4. The docking system as recited in claim 3, wherein said radio frequency absorbent material is ferrite.

5. The docking system as recited in claim 1, wherein said further signal transmission line comprises a further antenna located at a location remote from said shielded housing.

6. The docking system as recited in claim 5, wherein said shielded housing is articulable with respect to said further antenna.

7. The docking system as recited in claim 5, wherein said further signal transmission line comprises a coaxial electrical cable.

8. The docking system as recited in claim 5, wherein said portable communication device is a cellular telephone.

9. The docking system as recited in claim 5, wherein said shielded housing is articulably attached to a support structure, to permit adjustability with respect thereto.

10. A method of coupling a portable communication device having an external radiative antenna, to a signal transmission line for the purpose of effecting radio signal transmission therebetween, said method comprising the steps of:

arranging a shielded housing in attachment with said signal transmission line;

mounting a coupling probe within said shielded housing and in communication with said signal transmission line; and inserting said external radiative antenna of said portable communication device into said shielded housing so as to permit radiative communication between said external radiative antenna and said signal transmission line via said coupling probe.

11. The method of coupling the portable communication device to the signal transmission line, as recited in claim 10, including the step of:

attaching a further antenna to said signal transmission line at a location remote from said shielded housing.

12. The method of coupling the portable communication device to the signal transmission line, as recited in claim 11, including the step of:

energizing said portable communication device so as to effectuate radiative transmission between said external radiative antenna of said portable communication device, and said coupling probe attached to said signal transmission line.

13. The method of coupling the portable communication device to the signal transmission line, as recited in claim 12, including the steps of:

arranging said signal transmission line in a structure; and articulating said shielded housing with respect to said structure to facilitate mating of said external antenna with respect to said shielded housing.

14. The method of coupling the portable communication device to the signal transmission line as recited in claim 13, wherein said device comprises a cellular telephone.

15. A system for coupling a cellular telephone having an external radiative antenna, to a separate signal transmission line, said system comprising:

a shielded housing arranged to confiningly contain radio frequency energy; and a coupling probe mounted within said housing, which probe is also in electrical communication with said separate signal transmission line;

said coupling probe arranged to radiatively transfer radio frequency energy between an external radiative antenna of a cellular telephone placed a spaced distance there adjacent, and said separate signal transmission line, to effectuate coupling thereof when said cellular telephone is energized.

16. The coupling system as recited in claim 15, wherein said separate signal transmission line also comprises a further radiative antenna disposed remotely with respect to said shielded housing.

* * * * *